United States Patent [19]
Osaka et al.

[11] Patent Number: 4,812,010
[45] Date of Patent: Mar. 14, 1989

[54] APPARATUS FOR ARRANGING A PLURALITY OF COATED OPTICAL FIBERS AND COLLECTIVE FUSION SPLICING METHOD USING THE APPARATUS

[75] Inventors: Keiji Osaka; Toru Yanagi; Yasuo Asano, all of Yokohama, Japan

[73] Assignee: Sumitomo Electric Industries, Ltd., Osaka, Japan

[21] Appl. No.: 151,643

[22] Filed: Feb. 2, 1988

[30] Foreign Application Priority Data

Feb. 6, 1987 [JP] Japan ................................. 62-26778
Sep. 25, 1987 [JP] Japan ............................... 62-240217
Sep. 25, 1987 [JP] Japan ............................... 62-240218

[51] Int. Cl.$^4$ ........................... G02B 6/40; G02B 6/38
[52] U.S. Cl. ................................ 350/96.22; 350/96.21
[58] Field of Search ................ 350/96.20, 96.21, 96.22

[56] References Cited

U.S. PATENT DOCUMENTS

| | | | |
|---|---|---|---|
| 4,148,559 | 4/1979 | Gauthier | 350/96.21 |
| 4,666,240 | 5/1987 | Caron et al. | 350/96.22 |
| 4,715,876 | 12/1987 | Osaka et al. | 350/96.21 |
| 4,725,297 | 2/1988 | Grigsby et al. | 350/96.21 X |
| 4,750,804 | 6/1988 | Osaka et al. | 350/96.21 X |

*Primary Examiner*—William L. Sikes
*Assistant Examiner*—Akm E. Ullah
*Attorney, Agent, or Firm*—Cushman, Darby & Cushman

[57] ABSTRACT

An method and apparatus for arranging a plurality of coated optical fibers in a plane and a simultaneous collective fusion splicing method using the apparatus, comprising the steps of: arranging first and second sets of the coated optical fibers in a plane; clamping, in each of the sets, end portions of the coated optical fibers by a clamping device; collectively removing, in both the first and second sets, coatings from the end portions of the coated optical fibers so as to obtain exposed fiber end portions; collectively cutting, simultaneously, in each of the sets, the exposed fiber end portions so as to obtain cut end faces; collectively fusion splicing simultaneously, the two sets of the cut end faces so as to produce joints of the first and second sets of fibers, and collectively reinforcing the joints.

19 Claims, 12 Drawing Sheets

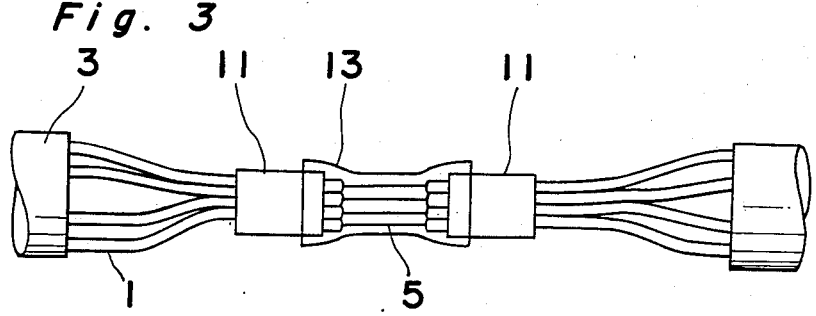
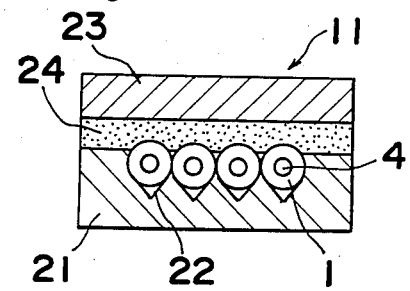
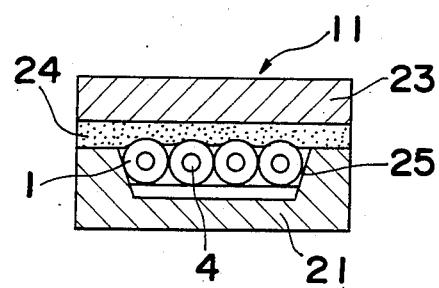
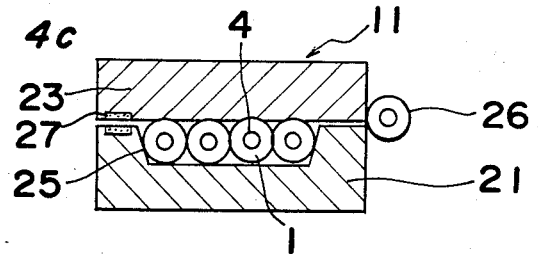
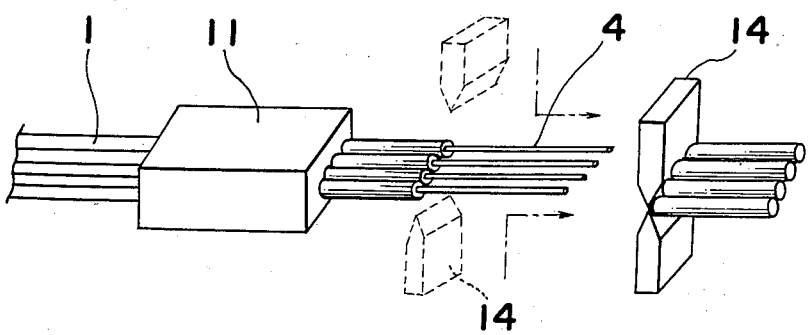

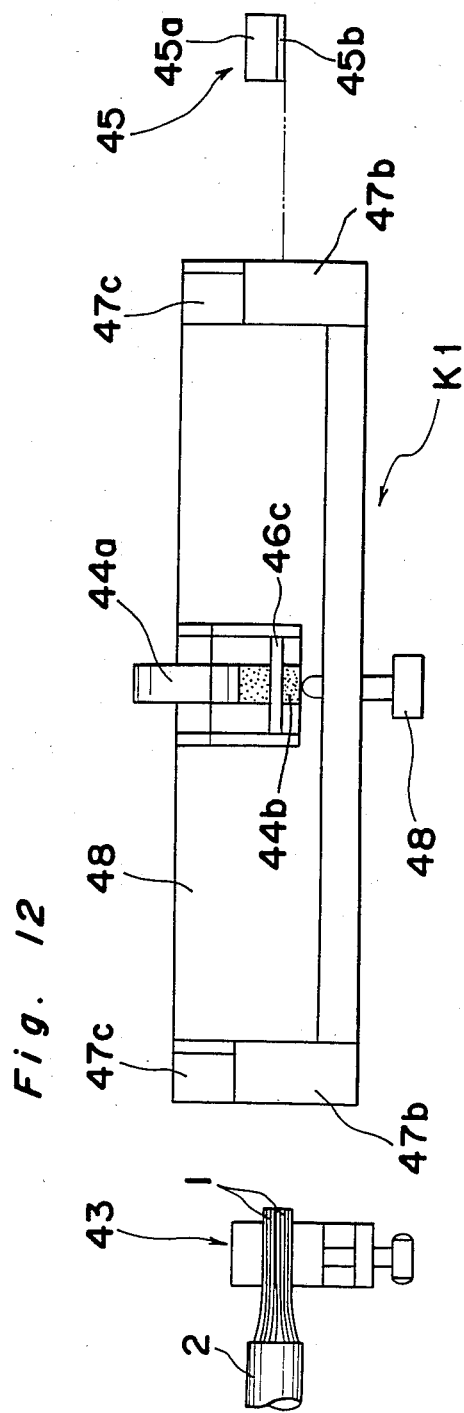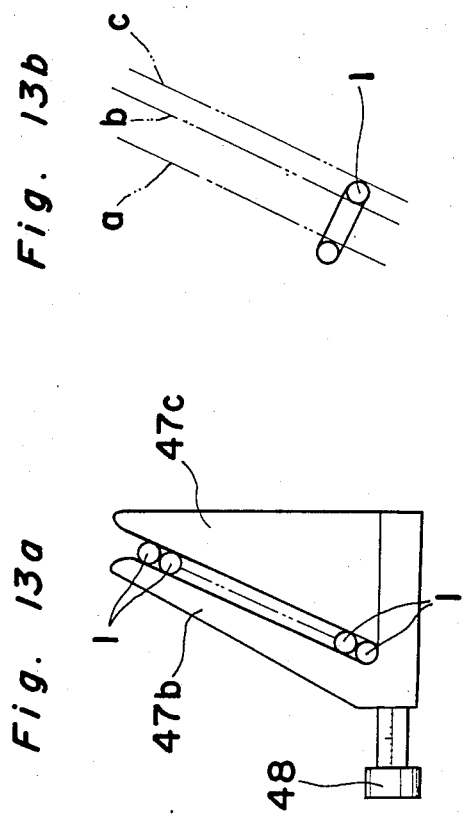
Fig. 12
Fig. 13a
Fig. 13b

APPARATUS FOR ARRANGING A PLURALITY OF COATED OPTICAL FIBERS AND COLLECTIVE FUSION SPLICING METHOD USING THE APPARATUS

BACKGROUND OF THE INVENTION

The present invention generally relates to optical fibers and more particularly, to an apparatus for arranging a plurality of coated optical fibers in a predetermined plane and a collective fusion splicing method using the apparatus, in which the coated optical fibers are collectively fusion spliced and reinforced.

Since optical fibers have been utilized for public communication, there is, at present, a keen demand for rationalization and facilitation of removal of coating from coated optical fibers and cutting and fusion splicing of the coated optical fibers in manufacture of optical fiber cables.

Conventionally, in order to join optical fibers permanently, a fusion splicing method is widely employed in which the optical fibers are joined with each other through fusion thereof by heat of aerial discharge.

In response to recent increase of quantity of optical transmission, multi-fiber optical fiber cables each having multiple coated optical fibers have become necessary. To this end, there are a ribbon type multi-fiber optical fiber cable in which a plurality of coated optical fibers 1 are collectively formed into a ribbonlike shape as shown in FIG. 1a and a loose tube type multi-fiber optical fiber cable in which a plurality of the coated optical fibers 1 are inserted into a tube 2 at random as shown in FIG. b.

In the ribbon type multi-fiber optical fiber cable, since it is possible to collectively perform removal of coatings of the coated optical fibers 1 and cutting and fusion splicing of the coated optical fibers 1, the manufacturing processes are simplified and the production cost is reduced, thereby resulting in rationalization and facilitation of joining of the coated optical fibers 1. Meanwhile, in the loose tube type multi-fiber optical fiber cable, the coated optical fibers 1 are joined one by one by using a single-core type fusion splicing apparatus. Thus, in view of recent trend of the multi-fiber optical fiber cables for increase of the number of the coated optical fibers 1 up to 600–3,000 in response to expansion of capacities of optical transmission lines, the loose tube type multi-fiber optical fiber cables have such a drawback that a time period required for joining the coated optical fibers 1 increases further.

Meanwhile, a technique for fusion splicing a plurality of the coated optical fibers 1 collectively and a technique for fusion splicing a plurality of the coated optical fibers 1 of the loose tube type multi-fiber optical fiber cable with those of the ribbon type multi-fiber optical fiber cable collectively have not been developed so far.

FIGS. 2a and 2b show a known method of joining the coated optical fibers 1. As shown in FIGS. 2a and 2b, the coated optical fibers 1 accommodated in a multi-fiber optical fiber cable 3 are separated from one another in the vicinity of an end of the cable 3 and glass portions 4 of the coated optical fibers 1 are fusion spliced with corresponding ones of the opposite coated optical fibers 1 individually, respectively such that joints 5 of the glass portions 4 are produced. Each of the joints 5 is reinforced by a reinforcing member such as a heat-shrinkable tube 6. The heat-shrinkable tube 6 contains hot-melt adhesive 8 in which a reinforcing core 7 is embedded.

However, the known joining method has such disadvantages that since a number of the coated optical fibers 1 are joined with each other individually, its operation is quite troublesome and time-consuming and that the joints 5 become large in size.

SUMMARY OF THE INVENTION

Accordingly, an essential object of the present invention is to provide a collective fusion splicing method which enables speedup of joining of coated optical fibers and reduction of size of joints of the coated optical fibers as well as joining of the coated optical fibers of a loose tube type multi-fiber optical fiber cable with those of a ribbon type multi-fiber optical fiber cable.

Another important object of the present invention is to provide, with a view to rationalization, facilitation and speedup of joining of the coated optical fibers, an apparatus of simple construction for arranging the coated optical fibers easily, which forms the coated optical fibers of a loose tube type optical fiber cable into those of ribbon type multi-fiber optical fiber cable.

In order to accomplish these objects of the present invention, a collective fusion splicing method embodying the present invention comprises the steps of: arranging a set of a plurality of coated optical fibers independent of one another and another set of a plurality of opposite coated optical fibers independent of one another, in a plane; clamping, in each of the sets, end portions of the coated optical fibers by a clamping device; collectively removing, in each of the sets, coatings from end portions of the coated optical fibers so as to obtain exposed fiber end portions of the coated optical fibers, respectively; collectively cutting, in each of the sets, the exposed fiber end portions so as to obtain cut end faces of the exposed fiber end portions, respectively; collectively fusion splicing the set of the cut end faces with another set of the cut end faces so as to produce joints of the two sets of the cut end faces, respectively; and collectively reinforcing the joints.

BRIEF DESCRIPTION OF THE DRAWINGS

These objects and features of the present invention will become apparent from the following description taken in conjunction with the preferred embodiments thereof with reference to the accompanying drawings, in which:

FIG. 3 is a view explanatory of a collective fusion splicing method of the present invention;

FIGS. 4a, 4b and 4c are sectional views of clamping devices employed in the method of FIG. 3;

FIG. 5 is a perspective view explanatory of collective removal of coatings from coated optical fibers in the method of FIG. 3;

FIG. 9b is a sectional view of the reinforced portion of FIG. 9a;

FIG. 12 is a top plan view of the apparatus of FIG. 11;

FIGS. 13a and 13b are views explanatory of operation of the apparatus of FIG. 11;

Before the description of the present invention proceeds, it is to be noted that like parts are designated by like reference numerals throughout several views of the accompanying drawings.

DETAILED DESCRIPTION OF THE INVENTION

Figure 1A:
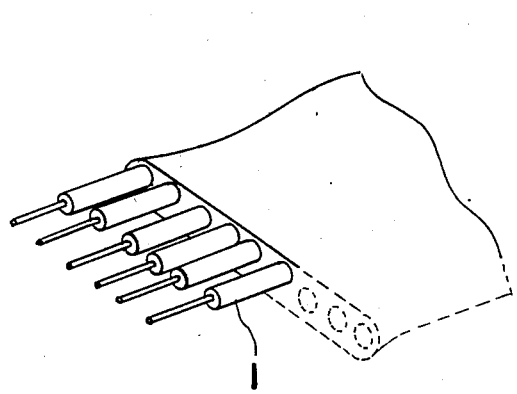
FIGS. 1a and 1b are perspective views of a ribbon type multi-fiber optical fiber cable and a loose tube type multi-fiber optical fiber cable, respectively (already referred to)
Figure 1B:
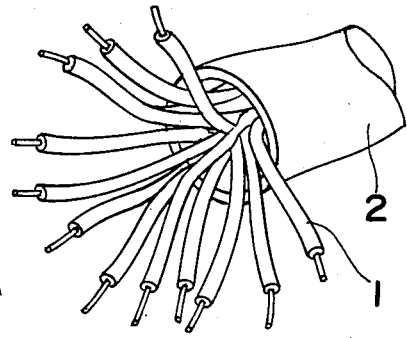
Figure 2A:
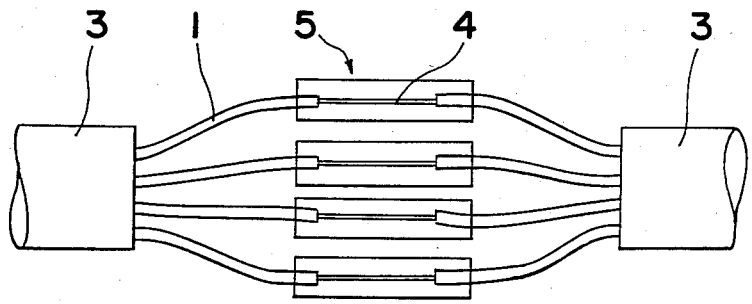
FIG. 2a is a view showing a prior art method of joining coated optical fibers (already referred to)
Figure 2B:
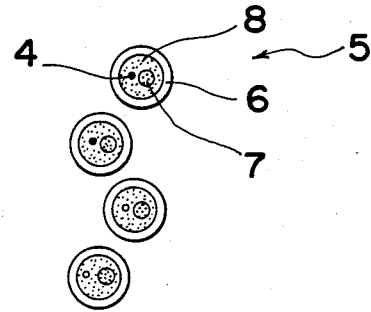
FIG. 2b is a sectional view of joints of the coated optical fibers of FIG. 2a (already referred to)

FIGS. 3 to 10 show a collective fusion splicing method of the present invention. Operational steps of the method of the present invention are sequentially described, hereinbelow. (1) Initially, a set of a plurality of coated optical fibers 1 independent of one another are arranged in a plane and are clamped, at end portions thereof, by a clamping device 11.

Examples of the clamping device 11 are shown in FIGS. 4a, 4b and 4c. In the clamping device of FIG. 4a, an upper lid 23 having an adhesive layer 24 provided on its inner face is placed on a base 21 formed, on its upper face, with a plurality of V-shaped grooves 22 for positioning the coated optical fibers 1. In the clamping device 11 of FIG. 4b, the base 21 is formed, on its upper face, with a recess 25 for collectively accommodating a plurality of the coated optical fibers 1 arranged in a plane and the upper lid 23 having the adhesive layer 24 provided on its inner face is placed on the base 21. Meanwhile, in the clamping device 11 of FIG. 4c, the base 21 is formed, on its upper face, with the groove 25 and the upper lid 23 is pivotally provided so as to be pivoted away from and towards the base 21 about a hinge 26. At one side of each of the upper lid 23 and the base 21 remote from the hinge 26, a pair of magnets 27 are embedded in opposite faces of the upper lid 23 and the base 21, respectively.

(2) By using a coating remover 14, coatings are collectively removed from end portions of the coated optical fibers 1 clamped by the clamping device 11 as shown in FIG. 5. Initially, the coating remover 14 is disposed at the position shown by broken lines. After the coatings have been cut by the coating remover 14, the coating remover 14 is displaced to the position shown by the solid lines, so that the coatings are removed from the end portions of the coated optical fibers 1 and thus, exposed fiber end portions 4 of the coated optical fibers 1 are obtained, respectively.

Figure 6:
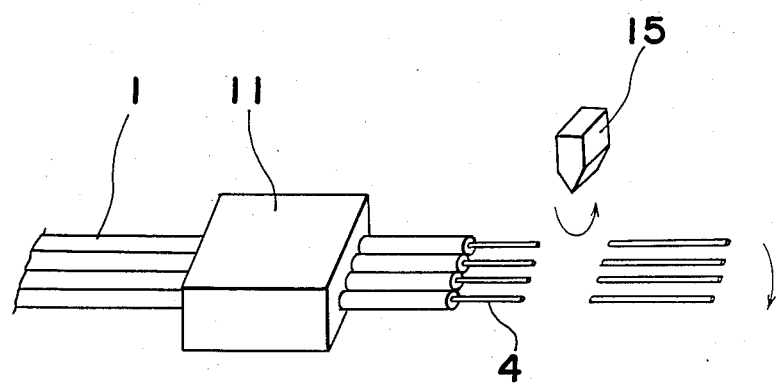
FIG. 6 is a perspective view explanatory of collective cutting of the coated optical fibers in the method of FIG. 3.

(3) The exposed fiber end portions 4 are collectively cut by a blade 15 so as to obtain cut end faces of the exposed fiber end portions as shown in FIG. 6.

Figure 7:
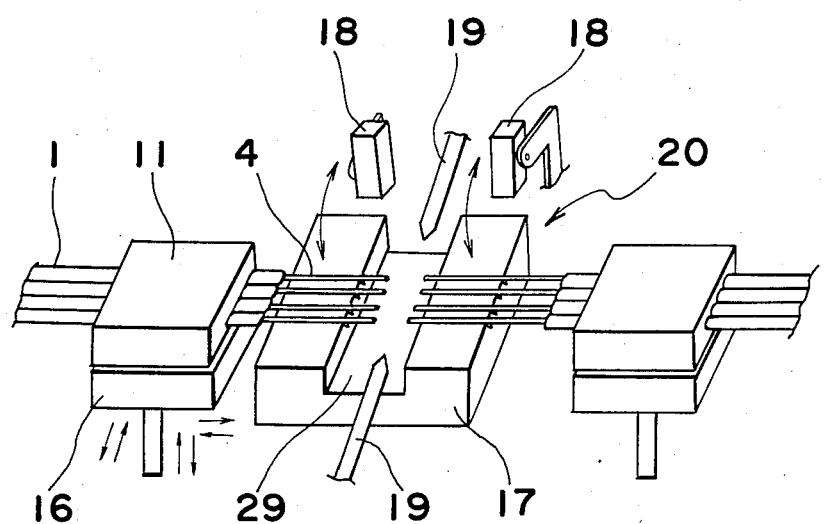
FIG. 7 is a perspective view of a fusion splicing apparatus employed in the method of FIG. 3.

(4) As shown in FIG. 7, the set of the exposed fiber end portions 4 and another set of the exposed fiber end portions 4 prepared by the above processings (1) to (3) are set on a coupling stage 17 of a multi-fiber collective fusion splicing apparatus 20 so as to confront each other and are collectively fusion spliced with each other through aerial discharge, so that joints 5 of the two sets of the cut end faces are produced, respectively. The collective fusion splicing apparatus 20 further includes a pair of clamps 18 for clamping the two sets of the exposed fiber end portions 4 onto the coupling stage 17, respectively and a pair of discharge electrodes 19 for effecting aerial discharge therebetween. In FIG. 7, the clamping device 11 is place on a fine adjustment base 16 movable in three orthogonal directions shown by the arrows.

Figure 8A:
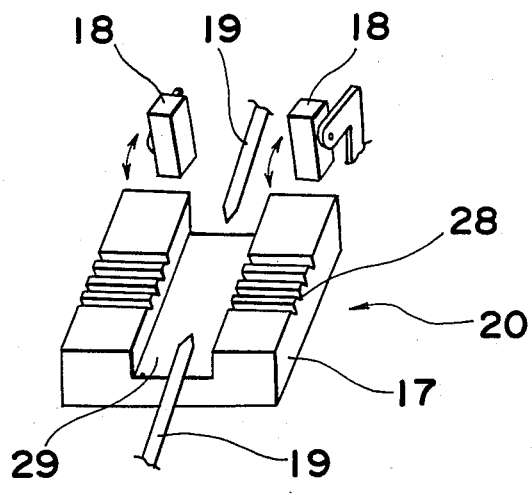
FIGS. 8a and 8b are views showing the fusion splicing apparatus of FIG. 7.
Figure 8B:
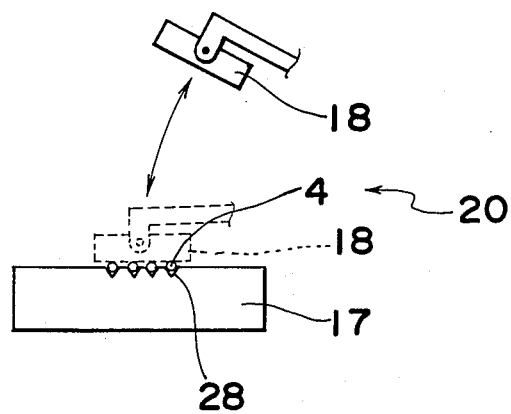

As shown in FIG. 8a, the coupling stage 17 is formed with a slot 29 extending therethrough at a central portion thereof. Two sets of a plurality of V-shaped grooves 28 aligned with each other are formed at opposite sides of the coupling stage 17 so as to interpose the slot 29 therebetween. As shown in FIG. 8b, the clamps 18 are pivotally provided. Thus, when the exposed fiber end portions 4 have been, respectively, fitted into the V-shaped grooves 28, the clamps 18 are pivoted towards the coupling stage 17 so as to depress the exposed fiber end portions 4 into the V-shaped grooves 28, respectively.

Figure 9A:
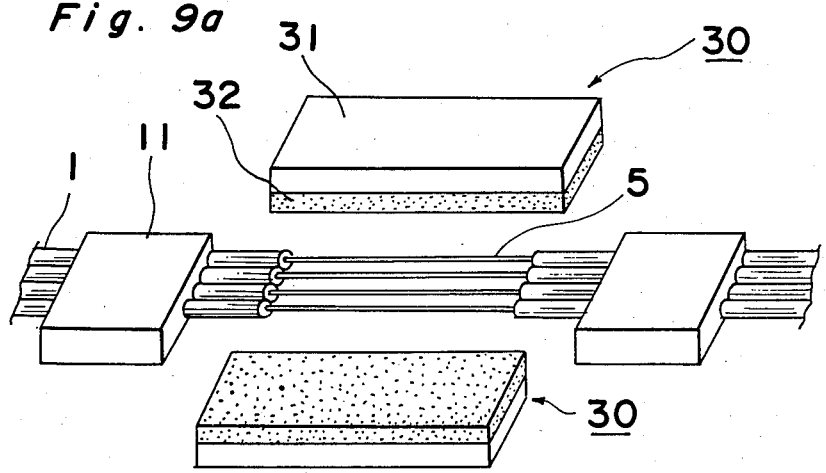
FIG. 9a is a view explanatory of one example of a reinforced portion employed in the method of FIG. 3.
Figure 9B:
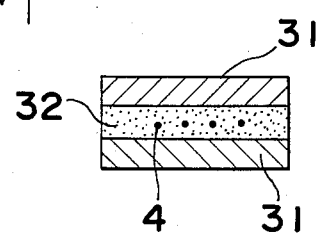

(5) The joined coated optical fibers 1 are taken out of the collective fusion splicing apparatus 20 and are set in a reinforcing device for reinforcing the joints 5. At this time, one of the following three reinforcing methods can be employed. In the first reinforcing method, the joints 5 are reinforced integrally with the clamping devices 11 by reinforcing material 13 as shown in FIG. 3. In the second reinforcing method, only the joints 5 are reinforced and the clamping devices 11 are left as they are. In the third reinforcing method, only the joints 5 are reinforced and the clamping devices 11 are removed from the coated optical fibers 1 such that a post handling such as rectification of excessively long ones of the coated optical fibers 1 is performed. FIGS. 9a and 9b show one example of reinforcement of the joints 5. In FIGS. 9a and 9b, each of a pair of reinforcing plates 30 includes a rectangular flat plate 31 provided, on its inner face, with a hot-melt adhesive layer 32. The joints 5 of the coated optical fibers 1 are interposed between the reinforcing plates 30 such that the hot-melt adhesive layers 32 of the reinforcing plates 30 confront each other. Then, the reinforcing plates 30 held in contact with each other through the joints 5 are heated by a heating coil 33. Thus, the opposite hot-melt adhesive layers 32 are melted together. As a result, the exposed fiber end portions 4 are integrally embedded in the hot-melt adhesive layer 32 between the flat plates 31 as shown in FIG. 9b.

Figure 10A:
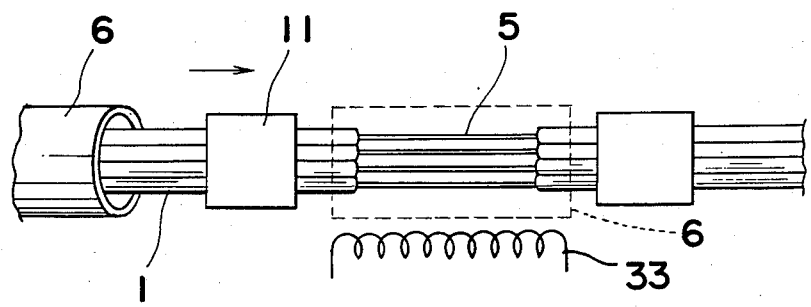
FIGS. 10a and 10b are views similar to FIGS. 9a and 9b, respectively, particularly showing another example thereof.
Figure 10B:
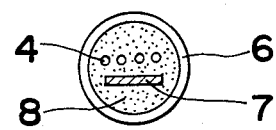
Figure 11:
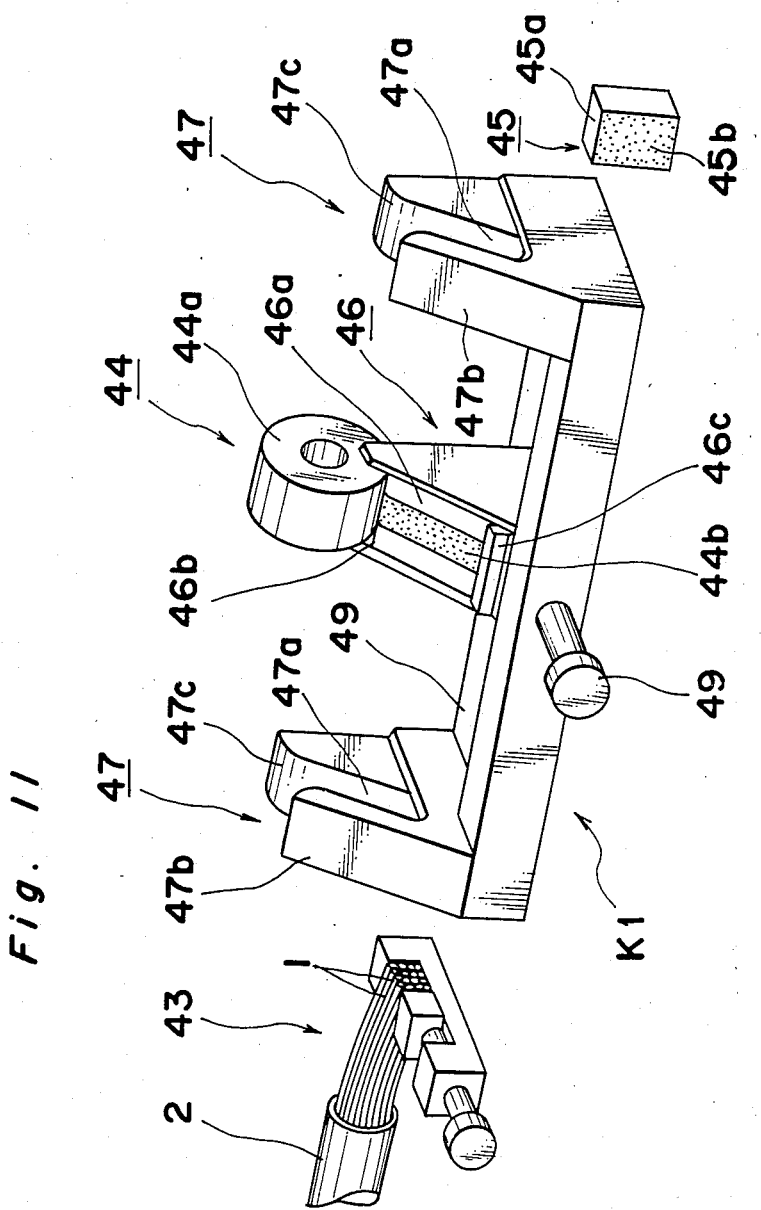
FIG. 11 is a perspective view of an apparatus for arranging the coated optical fibers according to a first embodiment of the present invention, which is applicable to the method of FIG. 3.

Meanwhile, FIGS. 10a and 10b show another example of reinforcement of the joints 5. In this example, a heat-shrinkable tube 6 containing a reinforcing core 7 and hot-melt adhesive 8 is beforehand passed around one of the two sets of the coated optical fibers 1 as shown by the solid lines and is, after collective fusion splicing of the exposed fiber end portions 4, displaced to the position shown by the broken lines, at which the heat-shrinkable tube 6 embraces the joints 5. Then, the heat-shrinkable tube 6 is heated by the heating coil 33 such that the hot-melt adhesive 8 is melted and thus, the exposed fiber end portions 4 and the reinforcing core 7 are integrally embedded in the hot-melt adhesive 8 as shown in FIG. 10b.

In the multi-fiber collective fusion splicing apparatus 20 of the method of the present invention, since each pair of the opposite exposed fiber end portions 4 are butt joined with each other through their alignment based on their outside diameters, the method of the present invention is applicable to any type of optical fibers regardless of whether the optical fibers are single-mode optical fibers or multimode optical fibers. It is apparent that the collective fusion splicing method of the present invention is also applicable to a ribbon type multi-fiber optical fiber cable in which a plurality of the coated optical fibers are arranged integrally as referred to earlier. Thus, a branch portion from the coated optical fibers of the ribbon type multi-fiber optical fiber cable to those of a loose tube type multi-fiber optical fiber cable can be made compact in size and can be produced rapidly.

As is clear from the foregoing description, in accordance with the collective fusion splicing method of the present invention, operating time required for performing collective fusion splicing is remarkably reduced as compared with a prior art method in which the coated optical fibers are fusion spliced with each other one by one and it becomes possible to make the obtained joints compact in size.

Furthermore, in accordance with the present invention, it becomes possible to fusion splice the coated optical fibers of the ribbon type multi-fiber optical fiber cable with those of the loose tube multi-fiber optical fiber cable and obtain therebetween a compact branch joint having a small connection loss.

Referring to FIGS. 11 to 14, there is shown an apparatus K1 for arranging the coated optical fibers 1 in a plane, according to a first embodiment of the present invention. This apparatus K1 may be applicable to the above described collective fusion splicing method of the present invention. The apparatus K1 mainly includes a rolled tape (tape feeding means) 44a for feeding an adhesive tape 44 for bonding the coated optical fibers 1 thereto, a tape fixing base (tape fixing means) 46 for fixing the adhesive tape 44 and a pair of positioning slit portions (positioning means) 47 for arranging the coated optical fibers 1. A plurality of the coated optical fibers 1 are inserted into the loose tube 2 at random and are integrally held by, for example, a clamp mechanism 43. This apparatus K1 is provided along optical axes of the coated optical fibers 1 and the adhesive tape 44 is disposed substantially at right angles to the optical axes of the coated optical fibers 1.

A fiber fixing member 45 for fixing end portions of the coated optical fibers 1 is provided adjacent to one end of a fixed base 49 remote from the clamp mechanism 43. In the fiber fixing member 45, a block 45a of rectangular parallelopiped stands and a double-sided adhesive tape 45b having opposite adhesive faces is bonded to one side face of the block 45a, which extends substantially in parallel with the optical axes of the coated optical fibers 1. Meanwhile, it is to be noted that the clamp mechanism 43 and the fiber fixing member 45 are not essential constituents elements of the apparatus K1 but are subordinate constituent elements of the apparatus K1. Therefore, the clamp mechanism 43 and the fiber fixing member 45 are not necessarily required for the apparatus K1 of the present invention.

Hereinbelow, construction of the apparatus K1 is described. The rolled tape 44a is placed on the tape fixing base 46 so as to be stretched in a direction substantially perpendicular to the optical axes of the coated optical fibers 1 such that an adhesive face of the adhesive tape 44 faces forwardly from the tape fixing base 46. The adhesive tape 44 may be a heat-resistant adhesive tape. In this embodiment, the rolled tape 44a is placed at an upper portion of the tape fixing base 46 but satisfaction of such a requirement is important that the adhesive face of the adhesive tape 44 faces forwardly from the tape fixing base 46 so as to extend in the direction substantially perpendicular to the optical axes of the coated optical fibers 1. Therefore, if the above described requirement is satisfied, the rolled tape 44a can also be disposed at a lower portion of the tape fixing base 46. The tape fixing base 46 has a flat portion 46a disposed obliquely in the direction substantially perpendicular to the optical axes of the coated optical fibers 1 and a tape support portion 46b for supporting the rolled tape 44a, which is disposed at an upper portion of the tape fixing base 46. Meanwhile, a fixing member 46c for fixing a distal end portion 44b of the adhesive tape 44 is provided at a lower portion of the tape fixing base 46. In the case where the rolled tape 44a is disposed at the lower portion of the tape fixing base 46, the fixing member 46c and the tape support portion 46b are, respectively, provided at the upper portion and the lower portion of the tape fixing base 46. The flat portion 46a has at least such an area as to enable the coated optical fibers of the ribbon type multi-fiber optical fiber cable to be arranged side by side. Meanwhile, it can also be so arranged that the fixing member 46c is formed by a magnet and the tape fixing base 46 is made of a magnetic metal such that the distal end portion 44b of the adhesive tape 44 is secured between the fixing member 46c and the tape fixing base 46.

At an upstream side and a downstream side of the tape fixing base 46 in the direction of the optical axes of the coated optical fibers 1, a pair of the positioning slit portions 47 for arranging the coated optical fibers 1 in parallel with each other at a predetermined interval either in numerical order or according to colors are provided, respectively. Each of the positioning slit portions 47 has a slit 47a defined by opposite members 47b and 47c therebetween. The slit 47a is so formed as to extend substantially in parallel with the plane of the flat portion 46a of the tape fixing base 46 and a width of the slit 47a is so set as to be slightly larger than the outside diameter of the coated optical fibers 1.

The width of the slit 47a can be changed if one of the opposite members 47b and 47c is of movable construction. In this case, scatter of size of the coated optical fibers can be dealt with and the apparatus is applicable to the coated optical fibers of various sizes. In this embodiment, since the opposite members 47c can be depressed horizontally in a direction substantially perpendicular to the optical axes of the coated optical fibers 1 by a distal end of a micrometer head 48 as shown in FIG. 12, the width of the slits 47a can be increased.

Meanwhile, since the opposite members 47c and the tape fixing base 46 are secured to the fixed base 49, relative position of the opposite members 47c and the tape fixing base 46 does not change.

Hereinbelow, operation of the apparatus K1 is described with reference to FIGS. 13a and 13b. As shown in FIG. 13a, the coated optical fibers 1 are inserted into the slit 47a either in numerical order or according to colors such as brown, red, black, etc. Since the opposite members 47c are of movable construction as described above, the width of the slit 47a can be adjusted by screwing the micrometer head 48 in case the coated optical fibers 1 of a larger outside diameter are inserted into the slit 47a. FIG. 13b shows a profile a (shown by the two-dot chain line) of the flat portion 46a of the tape fixing base 46 and profiles b and c (shown by the two-dot chain lines) of the opposite members 47b and 47c defining the slit 47a therebetween. The coated optical fibers 1 are accommodated between the two-dot chain lines b and c, i.e. in the slit 47a but the two-dot chain line a slightly deviates from the two-dot chain lines b and c. Thus, the coated optical fibers 1 are so disposed as to be depressed against the flat portion 46a. Therefore, the coated optical fibers 1 can be easily attached to the adhesive tape 44 secured to the flat portion 46a.

Figure 14:
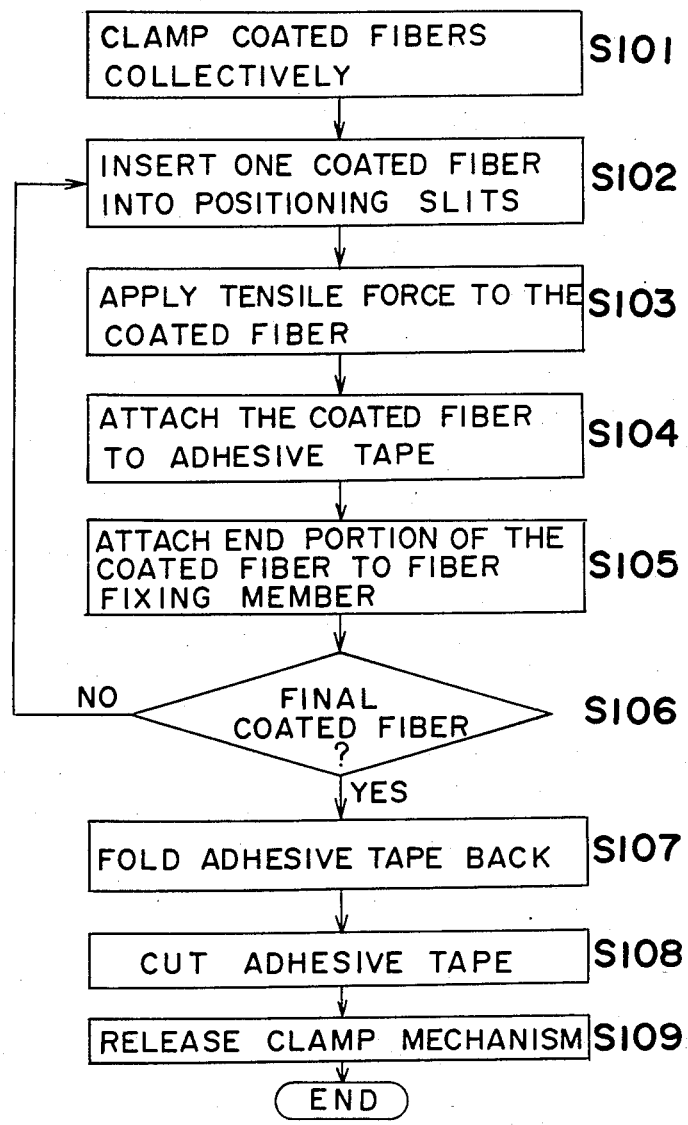
FIG. 14 is a flow chart showing operation of the apparatus of FIG. 11.

Then, operation of the apparatus K1 in the case of a loose tube type multi-fiber optical fiber cable 2 having 12 coated optical fibers is described with reference to a flow chart of FIG. 14. Initially, at step S101, the 12 coated optical fibers 1 in the loose tube 2 are longitudinally equally arranged at distal ends thereof and are collectively clamped, at a location thereof spaced about 20 cm from the distal ends, by the clamp mechanism 43. Then, at step S102, a first one of the 12 coated optical fibers 1 is selected and is inserted into the two slits 47a. Subsequently, at step S103, the coated optical fiber 1 is slid to the bottom of the slits 47a so as to be in a linear state and a predetermined tensile force is applied to the coated optical fiber 1. Thus, the coated optical fiber 1 is attached to the adhesive tape 44 at step S104. Thereafter, at step S105, a distal end portion of the coated optical fiber 1 is secured to the fiber fixing member 45 such that the coated optical fiber 1 is kept in a clamping state.

The above described steps are repeated for the remaining coated optical fibers 1. If it is found at step S106 that all the 12 coated optical fibers 1 have been arranged side by side in the slits 47a, the distal end portion 44b of the adhesive tape 44 is folded back so as to embrace the 12 coated optical fibers 1 such that the 12 coated optical fibers 1 are clamped by the adhesive tape 44 at step S107. Then, at step S108, an end portion of the adhesive tape 44 is cut so as to be separated from the 12 coated optical fibers 1 embraced by the distal end portion 44b. Subsequently, at step S109, the clamp mechanism 43 is released such that the 12 coated optical fibers 1 are taken out of the slits 47a. At this time, the coated optical fibers 1 are of a construction of a ribbon type multi-fiber optical fiber cable.

As will be seen from the description given so far, in the present invention, the coated optical fibers can be easily arranged in a predetermined order by the apparatus of simple construction. Therefore, in accordance with the apparatus of the present invention, the coated optical fibers of the loose tube type multi-fiber optical fiber cable can be easily formed into those of the ribbon type multi-fiber optical fiber cable, thereby resulting in rationalization, facilitation and speedup of joining of the coated optical fibers.

Figure 15:
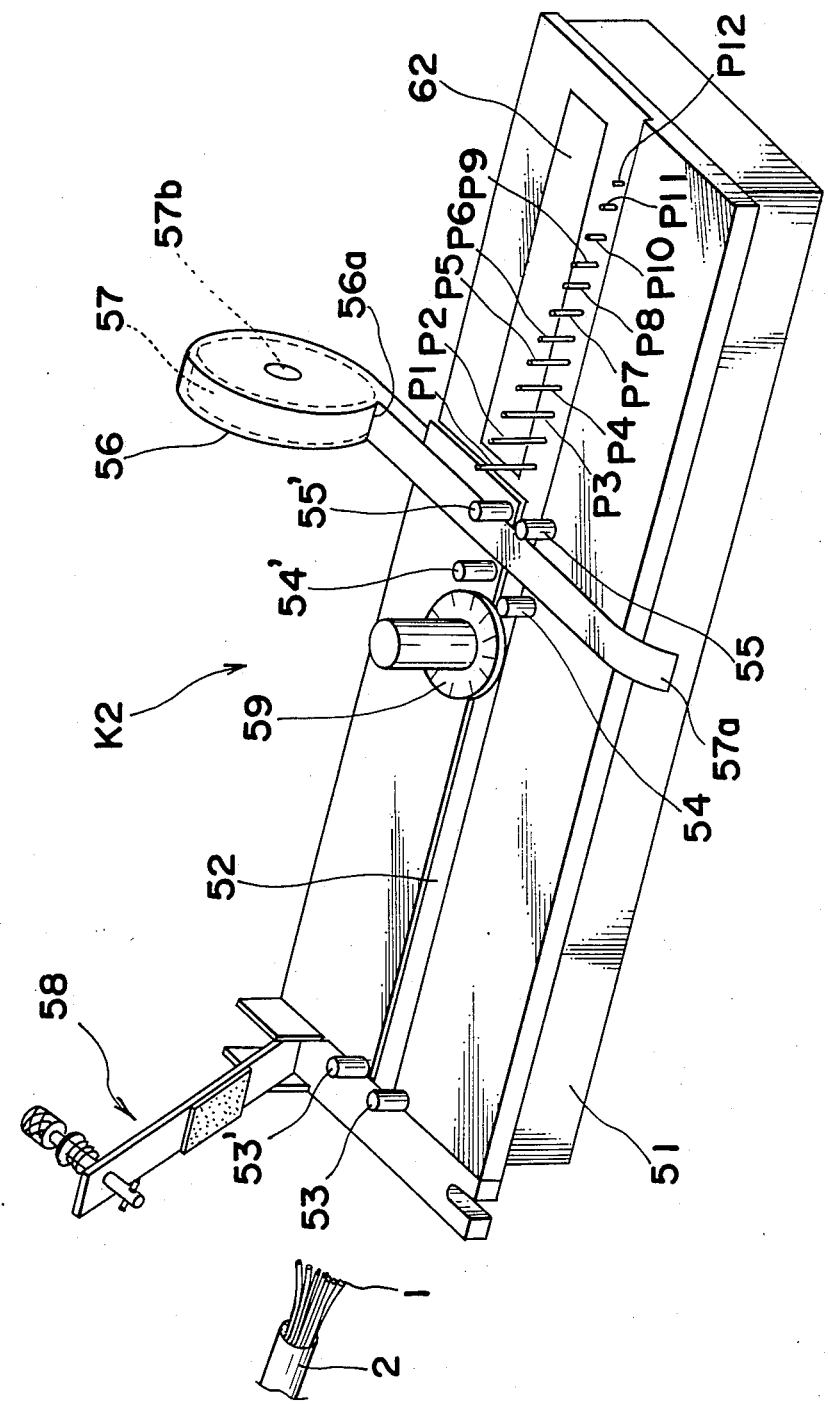
FIG. 15 is a perspective view of an apparatus for arranging the coated optical fibers according to a second embodiment of the present invention, which is applicable to the method of FIG. 3.

Referring to FIGS. 15 to 19, there is shown an apparatus K2 for arranging the coated optical fibers 1 in a plane, according to a second embodiment of the present invention. The apparatus K2 is applicable to the collective fusion splicing method of the present invention. In FIG. 15, the apparatus K2 is used for arranging 12 coated optical fibers 1 of the loose tube type multi-fiber optical fiber cable 2 into those of the ribbon type multi-fiber optical fiber cable. A slot 52 is formed in a longitudinal direction on a fixed base 51 having a shape of rectangular parallelopiped substantially. Three pairs of guide pins 53 and 53', 54 and 54' and 55 and 55' stand on the fixed base 51 along and at opposite sides of the slot 52. The guide pins 53 and 53' are provided at one end of the fixed base 51, while the guides pins 54 and 54' and the guide pins 55 and 55' are provided relatively adjacent to one another.

In order to prevent the positioned coated optical fibers 1 from being readily displaced, it can also be so arranged that a plurality of V-shaped grooves are formed on a bottom of the slot 52 at an interval equal to that for arranging the coated optical fibers 1. In this case, positional deviation of the coated optical fibers 1 can be obviated and positioning of the coated optical fibers 1 can be performed easily.

Furthermore, in order to not only increase a frictional force between the coated optical fibers 1 and the bottom of the slot 52 but protect the coated optical fibers 1, elastic material such as rubber may be bonded to the bottom of the slot 52. Thus, positional deviation of the coated optical fibers 1 can be prevented and it becomes possible to prevent damage to the coated optical fibers 1 due to an excessive force produced by improper mounting of an equiangular plate 59.

An adhesive tape 57a for securing the coated optical fibers 1 is supplied between the guide pins 54 and 55 and the guide pins 54' and 55'. The adhesive tape 57a may be a heat-resistant adhesive tape and is drawn from a rolled tape 57 contained in a tape case 56. The adhesive tape 57a is used for bonding thereto the coated optical fibers 1 arranged in the slot 52 and extends in a direction substantially perpendicular to the longitudinal direction of the slot 52 such that an adhesive face of the adhesive tape 57a confronts the slot 52. Therefore, the tape case 56 is provided such that not only a reel shaft 57b of the tape case 56 extends in parallel with the longitudinal direction of the slot 52 but a tape outlet 56a of the tape case 56 is disposed at one side of the tape case 56 adjacent to the slot 52.

Figure 16:
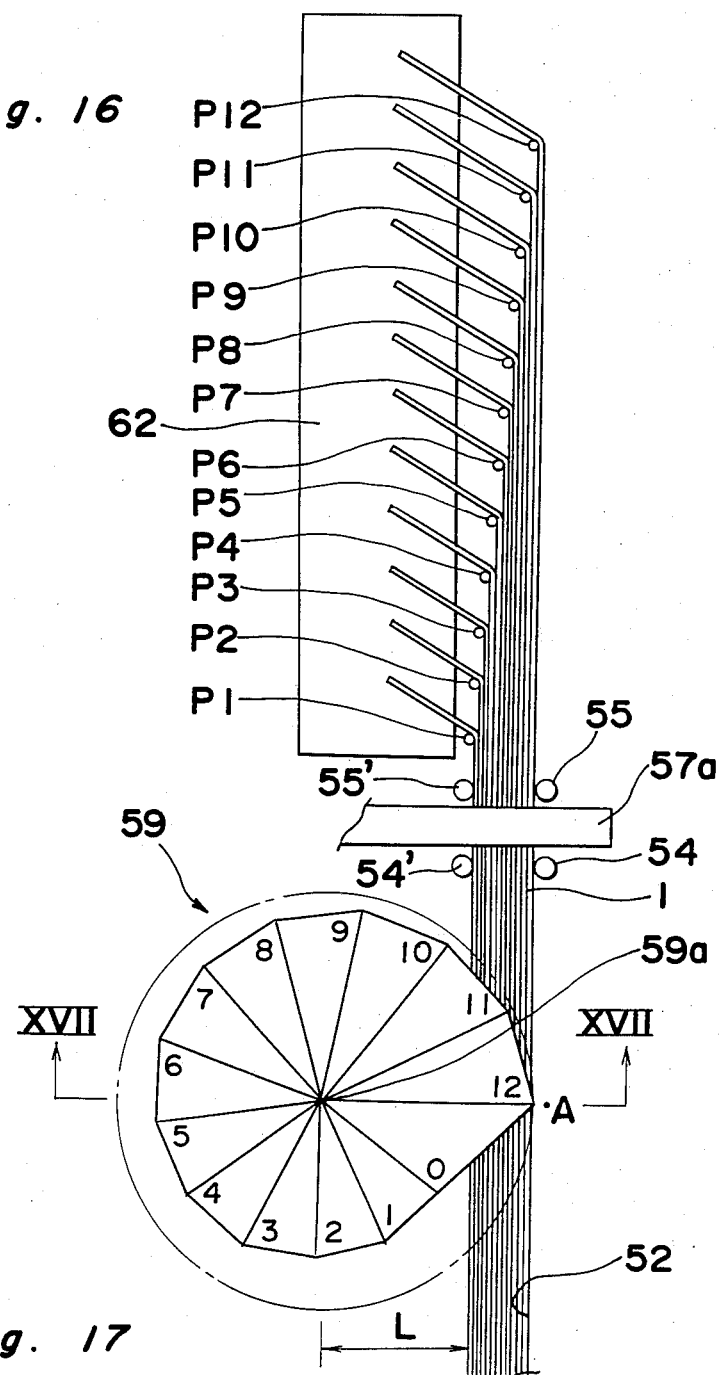
FIG. 16 is a fragmentary top plan view of the apparatus of FIG. 15.
Figure 17:
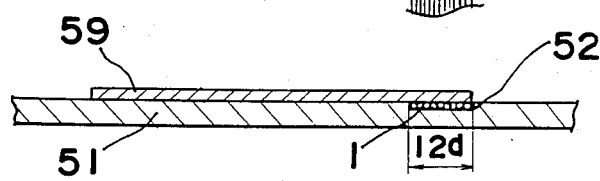
FIG. 17 is a sectional view taken along the line XVII—XVII in FIG. 16.
Figure 18A:
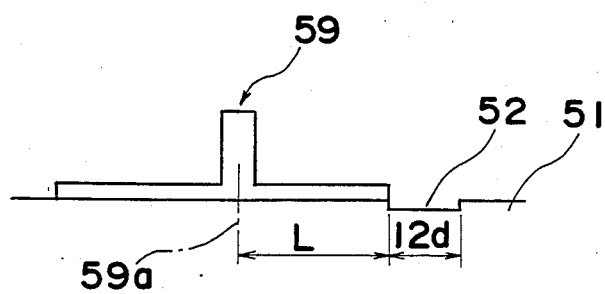
FIGS. 18a, 18b and 18c are views explanatory of operation of the apparatus of FIG. 15.
Figure 18B:
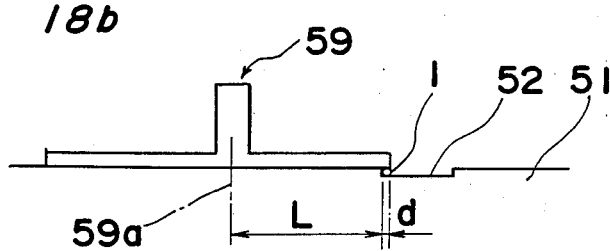
Figure 18C:
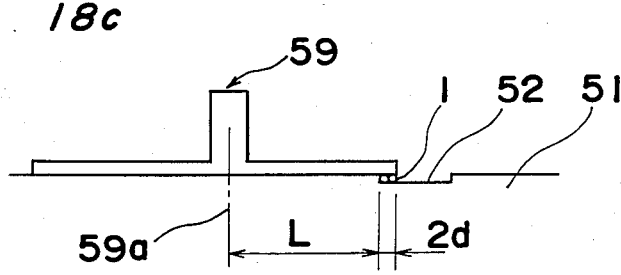

In the vicinity of the guide pins 53 and 53', a clamp mechanism 58 for collectively holding a plurality of the coated optical fibers 1 supplied from the loose tube type multi-fiber optical fiber cable 2 is mounted on the fixed base 51. Between the guide pins 53 and 53' and the guide pins 54 and 54', the equiangular plate 59 having 12 angles is mounted on the fixed base 51 so as to be rotated about a vertical rotational axis 59a. FIGS. 16 and 17 show a state in which the 12 coated optical fibers 1 are temporarily held by the equiangular plate 59. Graduations "0" to "12" are allotted to vertexes of the 12 angles, respectively such that a distance from the rotational axis 59a to each of the vertexes increases in proportion to the number of the gradations "0" to "12". For example, assuming that character L denotes a distance from the rotational axis 59a to the slot 52 as shown in FIG. 16 and character d denotes an outside diameter of the coated optical fibers 1 as shown in FIG. 18b, a width of the slot 52 assumes a value of 12d as shown in FIG. 17 and a distance between the angle "0" and the rotational axis 59a assumes a value of L as shown in FIG. 18a. A distance between the angle "1" and the rotational axis 59a assumes a value of (L+d) as shown in FIG. 18b and a distance between the angle "2" and the rotational axis 59a assumes a value of (L+2d) as shown in FIG. 18c. Likewise, a distance between the angle "12" and the rotational axis 59a assumes a value of (L+12d) as shown in FIGS. 16 and 17. Therefore, when the first coated optical fiber 1 is positioned, the angle "1" is set to a point A shown in FIG. 16 and thus, only the first coated optical fiber 1 is secured between the equiangular plate 59 and the slot 52 as shown in FIG. 18b. It is to be noted that the point A is located on a line drawn at right angles to the longitudinal direction of the slot 52 from the rotational axis 59a. At this time, the equiangular plate 59 does not pose any problem in insertion of the second coated optical fiber 1 into the slot 52.

The equiangular plate 59 may be formed by an eccentric circular plate in which an eccentricity between its rotational axis and its circular center is at least a half of the width of the slot 52. Since the circular plate is simpler, in construction, than the equiangular plate 59, the circular plate has such an advantage as its easy manufacture.

In order to arrange the coated optical fibers 1 accurately at a predetermined interval, it is desirable that the equiangular plate 59 is provided in the vicinity of the adhesive tape 57a. Thus, in this embodiment, the equiangular plate 59 is is provided adjacent to the guide pins 54 and 54'.

Meanwhile, 12 positioning pins P1 to P12 are driven into the slot 52 at predetermined intervals so as to be disposed gradually forwardly in the longitudinal direction from the guide pins 55 and 55' and deviate gradually from one side to the other side of the slot 52. As shown in FIG. 15, the positioning pins P1 to P12 are so formed as to become larger in height as the positioning pins P1 to P12 come closer to the adhesive tape 7a such that the coated optical fibers 1 can be easily hung from the corresponding positioning pins P1 to P12. The positioning pins P1 to P12 are positioned at an interval of at least 10 times the outside diameter of the coated optical fibers 1, i.e. at an interval of not less than 10d in the longitudinal direction of the slot 52 and at an interval equal to the outside diameter of the coated optical fibers 1, i.e. at an interval of d in a lateral direction perpendicular to the longitudinal direction of the slot 52. Therefore, the coated optical fibers 1 can be positioned easily without applying a large bending stress to the coated optical fibers 1.

FIG. 16 shows a state in which the 12 coated optical fibers 1 are positioned by the positioning pins P1 to P12, respectively. As shown in FIG. 16, a double-sided adhesive tape 62 having opposite adhesive faces is bonded to the fixed base 51. The coated optical fibers 1 hung from the respective positioning pins P1 to P12 are temporarily attached to the adhesive tape 62 so as to kept in this state.

Figure 19:
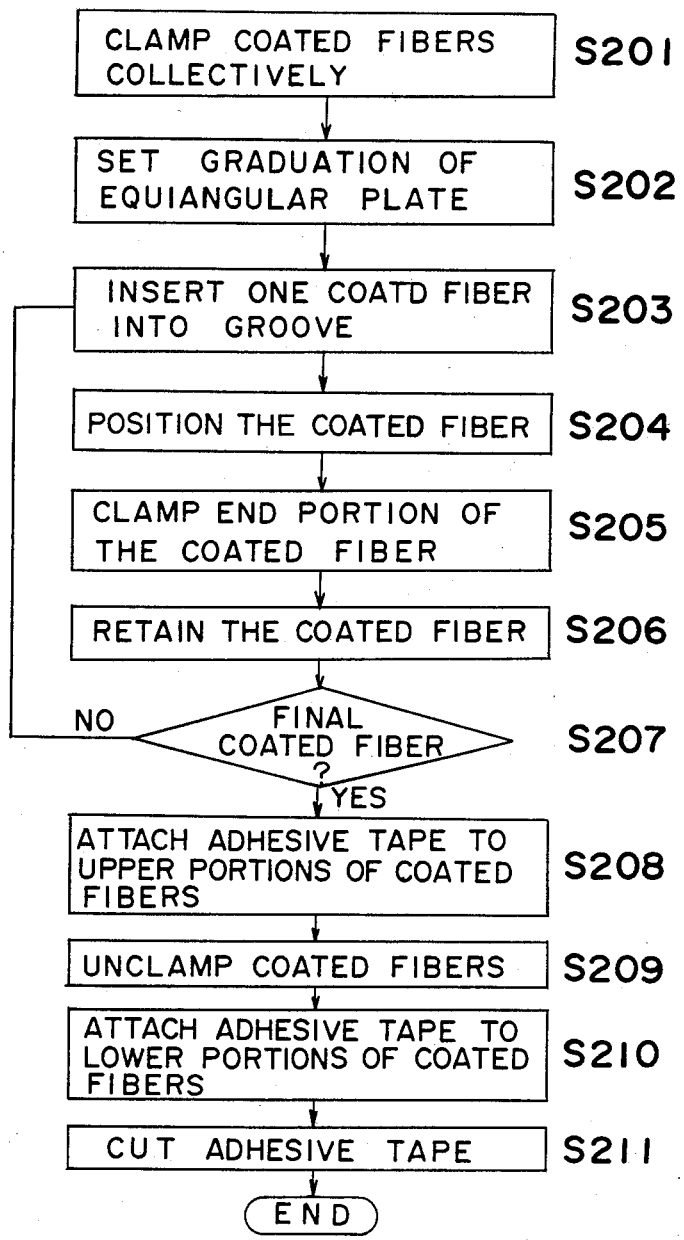
FIG. 19 is a flow chart showing operation of the apparatus of FIG. 15.

Hereinbelow, operation of the apparatus K2 is described with reference to a flow chart of FIG. 19. Initially, at step S201, the 12 coated optical fibers 1 in the loose tube 2 are longitudinally equally arranged at distal ends thereof and are bundled, at a location thereof spaced about 20 cm from the distal ends, into a parallel state so as to be collectively held and clamped by the clamp mechanism 58. Then, the graduation "0" of the equiangular plate 59 is set to the point A at step S202 as shown in FIG. 18a. Subsequently, at step S203, a first one of the coated optical fibers 1 is selected and is inserted into the slot 52 along the guide pins 53', 54' and 55'. Thereafter, at step S204, the first coated optical fiber 1 is positioned by hanging the first coated optical fiber 1 from the positioning pin P1. Then, at step S205, an end portion of the first coated optical fiber 1 is attached to the adhesive tape 62 while being slightly stretched so as to be kept in the positioning state.

Then, at step S206, the equiangular plate 59 is rotated so as to set the graduation "1" to the point A such that the first coated optical fiber 1 is retained between the equiangular plate 59 and the slot 52. Furthermore, by repeating the above described steps, the second coated optical fiber 1 is inserted along the first coated optical fiber 1 into the slot 52 and is hung from the positioning pin P2 such that an end portion of the second coated optical fiber 1 is attached to the adhesive tape 62. Subsequently, the graduation "2" of the equiangular plate 59 is set to the point A such that the positioned two coated optical fibers 1 are retained between the equiangular plate 59 and the slot 52 as shown in FIG. 18c.

By sequentially repeating the above described steps, the 12 coated optical fibers 1 are clamped in parallel with each other in the slot 52. If it is found at step S207 that all the 12 coated optical fibers 1 have been arranged in the slot 52 either in numerical order or according to colors, the adhesive tap 57a is drawn from the tape case 56 and is attached to upper portions of the 12 coated optical fibers 1 at step S208. Namely, in FIG. 15, the adhesive tape 57a has an adhesive face confronting the fixed base 51. Then, at step S209, the end portions of the coated optical fibers 1 are removed from the adhesive tape 62 and thus, the coated optical fibers 1 are unclamped by setting the graduation "0" to the point A and releasing the coated optical fibers 1 from the clamp mechanism 58. Subsequently, at step S210, a distal end portion of the adhesive tape 57a is folded back to a lower side of the coated optical fibers so as to embrace the coated optical fibers 1. Subsequently, at step S211, an end portion of the adhesive tape 57a is cut so as to be separated from the coated optical fibers 1 embraced by the distal end portion of the adhesive tape 57a. Thus, a ribbon type multi-fiber optical fiber cable having the 12 coated optical fibers 1 is obtained, thereby resulting in completion of arrangement of the 12 coated optical fibers 1.

As will be apparent from the foregoing, in the present invention, a plurality of the coated optical fibers can be arranged at a predetermined interval and in a predetermined order. Therefore, in accordance with the apparatus of the present invention, the coated optical fibers of the loose tube type multi-fiber optical fiber cable can be easily formed into those of the ribbon type multi-fiber optical fiber cable, thereby resulting in rationalization, facilitation and speedup of joining of the coated optical fibers.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of simultaneously fusion splicing a plurality of coated optical fibers with corresponding opposing coated optical fibers collectively, comprising the steps of:

arranging a first set of plurality of coated optical fibers independent of one another and a second set of a plurality of opposite coated optical fibers independent of one another, in a plane;

clamping in both said first and second sets, end portions of said coated optical fibers by a clamping device;

collectively removing, simultaneously, in both said first and second sets, coating from said end portions of said coated optical fibers so as to obtain exposed fiber end portions, respectively;

collectively cutting simultaneously, in both said first and second sets, said exposed fiber end portions so as to obtain cut end faces of said exposed fiber end portions, respectively;

collectively fusion splicing simultaneously, said first set of the cut end faces with said second set of said cut end races so as to produce joints of said first and second sets of said cut end faces, respectively; and collectively reinforcing said joints.

2. A method as claimed in claim 1, wherein said joints are collectively reinforced integrally with said clamping devices.

3. A method as claimed in claim 1, wherein only said joints are reinforced and then, the clamping devices are removed from the coated optical fibers.

4. A method as claimed in claim 1, wherein one set of said first and second sets of the coated optical fibers are integrally contained in a ribbon type multi-fiber optical fiber cable.

5. A method as claimed in claim 3, wherein one set of said first and second sets of said coated optical fibers are integrally contained in a ribbon type multi-fiber optical fiber cable.

6. An apparatus for arranging a plurality of coated optical fibers in a predetermined plane, comprising:

a tape supply means for supplying and adhesive tape for bonding said coated optical fiber thereto;

a tape fixing means for fixing in said predetermined plane said adhesive tape drawn from said tape supply means; and a positioning means for positioning said coated optical fibers so as to secure said optical fibers to said adhesive tape fixed by said tape fixing means;

said positioning means being formed with a slit for sequentially accommodating said coated optical fibers;

said slit being substantially parallel to said predetermined plane.

7. An apparatus as claimed in claim 6, wherein a width of said slit can be changed in a direction substantially perpendicular to said predetermined plane.

8. An apparatus as claimed in claim 6, wherein said tape fixing means is provided in an oblique direction perpendicular to the optical axis of said coated optical, fibers such that said coated optical fibers are arranged in said oblique direction.

9. An apparatus as claimed in claim 6, wherein said adhesive tape comprises a heat-resistance adhesive tape.

10. An apparatus for arranging a plurality of coated optical fibers at a predetermined interval in a plane, comprising:

a positioning means for positioning said coated optical fibers said positioning means comprising a slot for placing the coated optical fibers thereon, a guide member for introducing the coated optical fibers into said slot, which is provided along said slot, a plurality of positioning members for positioning said coated optical fibers, said fibers provided at one end portion of said slot, a rotational plate for temporarily holding, through sequential rotation thereof said coated optical fibers accommodated and arranged in said slot by said positioning members;

a fixing means for temporarily fixing distal end portions of said coated optical fibers arranged by said positioning means; and a tape supply means for supplying in a direction substantially perpendicular to an optical axis of said coated optical fibers, an adhesive tape to secure said the coated optical fibers arranged by said positioning means, with an adhesive face of said adhesive tape confronting said slot.

11. An apparatus as claimed in claim 10, wherein said positioning members are disposed at an interval of at least 10 times an outside diameter of said coated optical fibers in a direction of said optical axis of said coated optical fibers and at a interval equal to the outside diameter of said coated optical fibers in a direction perpendicular to said optical axis of said coated optical fibers.

12. An apparatus as claimed in claim 10, wherein said positioning members are so provided as to become larger in height as said positioning members more closer to the tape supply means.

13. An apparatus as claimed in claim 10, wherein each said guide member and said positioning members comprises a cylindrical member.

14. An apparatus as claimed in claim 10, wherein said rotational plane comprises an equiangular plate having a plurality of angles at least equal, in number, to said coated optical fibers.

15. An apparatus as claimed in claim 10, wherein said rotational plate comprises an eccentric circular plate in which the eccentricity between its rotational axis and its rotational axis and its circular center is at least one-half the width of said slot.

16. An apparatus as claimed in claim 10, wherein said slot comprises a plurality of V-shaped grooves formed on the bottom of said slot at a predetermined interval for arranging said coated optical fibers.

17. An apparatus as claimed in claim 10, wherein elastic material is attached to a bottom of said slot.

18. An apparatus as claimed in claim 10, wherein said adhesive tape comprises heat-resistant adhesive tape.

19. An apparatus as claimed in claim 10, wherein said fixing means comprises an adhesive tape.

* * * * *